United States Patent [19]

Solomon

[11] 4,055,276
[45] Oct. 25, 1977

[54] CONTAINER FOR HYDROGEN ISOTOPES

[75] Inventor: David E. Solomon, Ann Arbor, Mich.

[73] Assignee: KMS Fusion, Inc., Ann Arbor, Mich.

[21] Appl. No.: 541,447

[22] Filed: Jan. 16, 1975

[51] Int. Cl.² .............................................. B67B 7/24
[52] U.S. Cl. ...................................................... 222/3
[58] Field of Search .......................... 55/16, 58, 62–66,
55/74, 158, 208; 222/54, 146 H, 146 HE, 3;
220/910; 423/648; 252/463

[56] References Cited

U.S. PATENT DOCUMENTS

| 2,234,738 | 3/1941 | Maude | 222/3 |
| 3,085,379 | 4/1963 | Kiyonaga et al. | 55/58 X |
| 3,307,330 | 3/1967 | Niedzielski et al. | 55/16 |
| 3,438,178 | 4/1969 | Betteridge et al. | 55/58 |
| 3,452,517 | 7/1969 | Buckland | 55/158 |
| 3,713,273 | 1/1973 | Coffee | 55/74 |

FOREIGN PATENT DOCUMENTS

| 961,925 | 6/1964 | Belgium | 55/66 |
| 866,029 | 4/1961 | United Kingdom | 222/3 |

Primary Examiner—Stanley H. Tollberg
Assistant Examiner—Hadd Lane
Attorney, Agent, or Firm—Barnes, Kisselle, Raisch & Choate

[57] ABSTRACT

A container for the storage, shipping and dispensing of hydrogen isotopes such as hydrogen, deuterium, tritium, or mixtures of the same which has compactness, which is safe against fracture or accident, and which is reusable. The container consists of an outer housing with suitable inlet and outlet openings and electrical feed elements, the housing containing an activated sorber material in the form, for example, of titanium sponge or an activated zirconium aluminate cartridge. The gas to be stored is introduced into the chamber under conditions of heat and vacuum and will be retained in the sorber material. Subsequently, it may be released by heating the unit to drive off the stored gas at desired rates.

7 Claims, 1 Drawing Figure

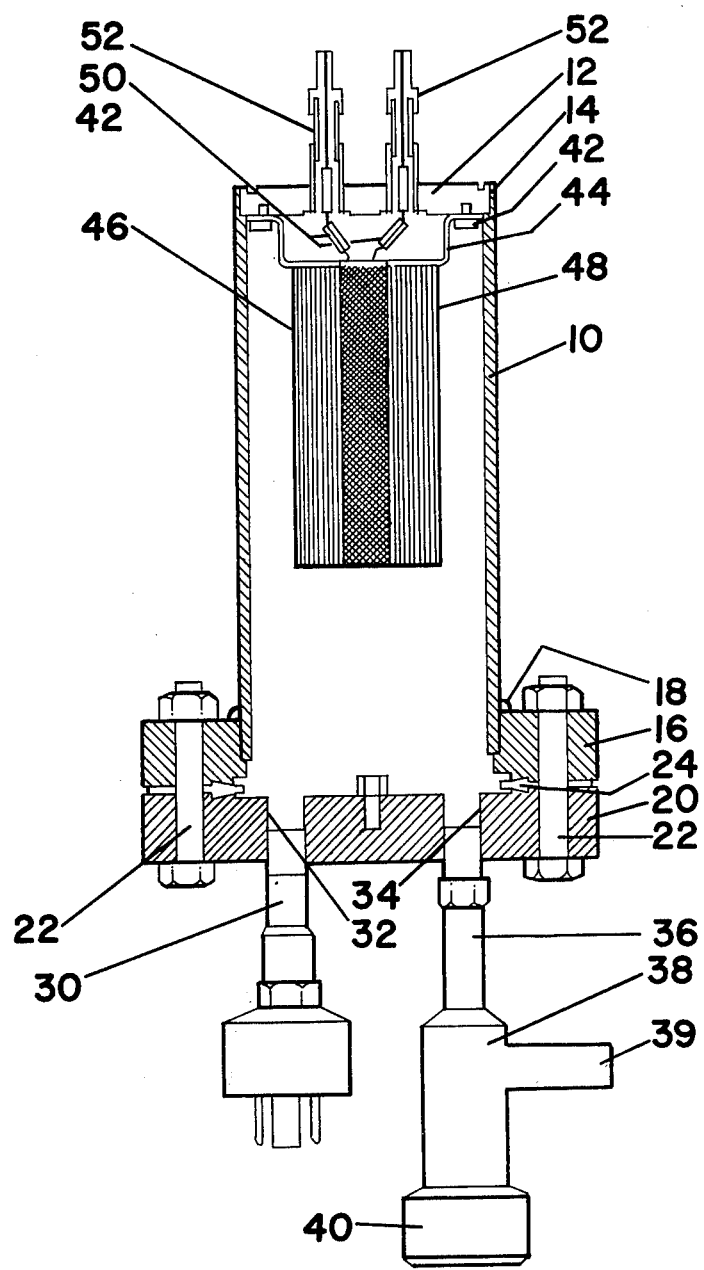

CONTAINER FOR HYDROGEN ISOTOPES

This invention relates to a Container for Hydrogen Isotopes and more particularly to a container which can be utilized to store, to ship and to dispense gases such as hydrogen isotopes which may be dangerous when released without control.

Reference is made to my copending application, Ser. No. 541,446, filed Jan. 16, 1975 on a "Storage and Shipping Container for Gas Filled pellets."

With the increasing interest in the achievement of fusion or hydrogen isotopes by exposure to high energy sources, it has become a problem to store, transfer and dispense the gases used in this process such as hydrogen, deuterium, tritium or mixtures of these gases. The tritium gas, of course, is hazardous to human beings when inhaled in large quantities and the hydrogen is explosive and highly inflammable. It is thus important that it be possible to handle these gases in a safe manner and utilizing equipment which is compact. Reference is made to a copending application of Robert J. Teitel, Ser. No. 481,708, filed June 21, 1974 on a "Process and Apparatus for Achieving Hydrogen Storage and Dispensing."

It is thus an object to provide a container for hydrogen isotopes which is extremely compact, which is safe against catastrophic failures such as fracture of the container or other inadvertent happenings and which is also reusable.

Briefly, the invention comprises utilizing a container dispenser which contains sorber material for gases which, when heated, will release the gases in a manner proportional to the particular heating temperatures.

Other objects and features of the invention relating to details of construction and operation will be apparent in the following description and claims in which the principles of the invention are set forth, together with the utility and in connection with the best mode presently contemplated for the practice of the invention.

A drawing accompanies the disclosure and the single view thereof may be briefly described as a sectional view of a storage and shipping container illustrating the various elements important to the construction and operation.

REFERRING TO THE DRAWINGS

The dispenser is shown having a cylindrical shell 10 provided with a stationary head end 12 which is welded in an annular groove at the end of the casing at 14 to seal this part of the container. The other end of the container is surrounded by a solid ring 16 which is suitably welded at 18 to the container in an annular groove. A removable head 20 can be applied over the ring 16 and held together by heavy hexagonal head bolts 22 distributed around the periphery of the head 20 and the ring 16. A suitable vacuum seal 24 is provided between the ring and the head. A thermocouple type vacuum gauge 30 is inserted into an opening 32 in the head 20. Another opening 34 receives a threaded pipe 36 which supports a valve 38. This valve 38 having an inlet-outlet pipe 39 has a control knob 40 and may be used for the ingress and egress of gas to and from the chamber.

The permanent head 12 has supported on the inside thereof by hex bolts 42 a bracket 44 which in turn supports a cartridge 46 of a reversible sorber material. One such sorber material is activated zirconium aluminate which is commercially available from SAES-Getter USA. Another sorber material is titanium sponge. A cartridge heater 48 is provided interior to and adjacent to the cartridge. The electrical connections for this heater are shown at 50 and these pass out through sealed electrical feed-through tubes 52.

In the operation of the device prior to the charging, the chamber 10 is subjected to a high vacuum and the zirconium aluminate cartridge or titanium sponge is heated by the resistance cartridge heater 48 to a temperature of approximately 800° C. A hydrogen isotope is then admitted through the pipe 39 controlled by the valve 38 and the hydrogen is sorbed and stably retained in solid form. This might be in the case of a hydrogen $ZrAlH_2$ or in the case of tritium $ZrAlT_2$.

A specified quantity of the hydrogen isotope would be admitted depending on the sorption capacity of the element of the cartridge 46. It should be noted here that inadvertent exposure to air due to container failure or for any other reason would have no effect on the stored hydrogen isotopes. This contributes to the safety of the container as a storage unit and a shipping unit. Materials that might be used as the storage cartridge are (1) titanium sponge, (2) zirconium metal foil, (3) hafnium wire, (4) scandium film, (5) aluminum oxide (ZEOLITE ®), or (6) zirconium aluminate.

After transportation to the site of use, the same container 10 can be used as a dispenser. The pipe 39 is connected to the desired gas distribution lines and the integral cartridge heater 48 is turned on. Thus, the hydrogen isotope which may be hydrogen deuterium or tritium, for example, is controllably dispensed. Applications included are (1) home and industrial heating with hydrogen, (2) vehicles fueled with hydrogen, and (3) shipping, storage, and dispensing of tritium which is the radioactive isotope of hydrogen. It will be appreciated that the rate of dispensing of the stored gas can be controlled by the valve 38 and/or the temperature of the cartridge heater which is driving the sorbed gas out into the container 10.

I claim:

1. A portable container for the storage, shipping and dispensing of hydrogen isotopic gases, which comprises:
   a. a hollow housing having opening means for the ingress and egress of hydrogen isotopic gas,
   b. a mass of sorber material in said hollow housing composed of activated zirconium aluminate which forms a stable solid material with the gas to be stored,
   c. means to control the ingress and egress of gas to and from said housing,
   d. means associated with and carried by said container to heat said sorber material to drive sorbed gas from the housing, and
   e. means externally of and carried by said container to connect said heater to an energy source.

2. A portable container for the storage, shipping and dispensing of hydrogen isotopic gases, which comprises:
   a. a hollow housing having opening means for the ingress and egress of hydrogen isotopic gas,
   b. a mass of sorber material in said hollow housing composed of one or more of the group comprising: titanium sponge, zirconium metal foil, hafnium wire, scandium film, aluminum oxide pellets, and zirconium aluminate,
   c. means to control the ingress and egress of gas to and from said housing, d. means associated with and carried by said container to heat said sorber material to drive sorbed gas from the housing, and
e. means externally of and carried by said container to connect said heater to an energy source.

3. A container for the storage, shipping and dispensing of gas which comprises:
a. a cylindrical container,
b. a plate permanently sealing one end of said cylinder,
c. a bracket on said plate,
d. a cylinder of sorber material mounted concentrically of said cylinder and supported by said bracket,
e. a ring sealed to the other end of said cylinder,
f. a closing head to overlie said ring to close said cylinder, and
g. means to clamp and seal said head to said ring.

4. A container as defined in claim 3 in which said closing head has an opening and a valve mounted in said opening to control ingress and egress to and from said cylinder.

5. A container as defined in claim 3 in which an electric heater is mounted on said cylinder of sorber material, and electrical conduit means passing through said plate to said heater.

6. A portable container for the storage, shipping and dispensing of gas which comprises:
a. a hollow housing having an inlet-outlet opening,
b. a quantity of sorber material exposed to the interior of said housing in the form of zirconium aluminate having an affinity for the gas to be sorted to form a stable solid material $ZrAlH_2$ with said gas,
c. a self-contained heater in said housing positioned to raise the temperature of said sorber material to facilitate sorption of and dispensing of gas, and
d. means externally of and carried by said container to connect said heater to an energy source.

7. A portable container for the storage, shipping and dispensing of gas which comprises:
a. a hollow housing having an inlet-outlet opening,
b. a quantity of sorber material exposed to the interior of said housing in the form of titanium sponge having an affinity for the gas to be stored to form a stable solid material $ZrAlT_2$,
c. a self-contained heater in said housing positioned to raise the temperature of said sorber material to facilitate sorption of and dispensing of gas, and
d. means externally of and carried by said container to connect said heater to an energy source.

* * * * *